United States Patent
Synder

(10) Patent No.: US 6,610,928 B2
(45) Date of Patent: Aug. 26, 2003

(54) THERMALLY INSULATIVE SLEEVE

(75) Inventor: Brian M. Synder, Downingtown, PA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/213,022

(22) Filed: Aug. 6, 2002

(65) Prior Publication Data

US 2003/0024850 A1 Feb. 6, 2003

Related U.S. Application Data

(60) Provisional application No. 60/310,392, filed on Aug. 6, 2001.

(51) Int. Cl.[7] ............... B29B 22/00; B32B 15/08; F16L 59/00
(52) U.S. Cl. ............... 174/68.3; 174/72 A; 428/34.6; 428/34.7; 428/35.9; 428/36.91; 442/378; 138/149
(58) Field of Search .................. 174/68.1, 68.3, 174/74 A, 72 C; 138/149, 151; 428/34.1, 34.6, 34.7, 35.9, 36.91; 442/378

(56) References Cited

U.S. PATENT DOCUMENTS

| | | | | |
|---|---|---|---|---|
| 2,474,619 A | * | 6/1949 | Farrell et al. ............... 428/129 |
| 4,576,845 A | * | 3/1986 | Krotchko .................. 428/35.9 |
| 4,820,561 A | * | 4/1989 | Pithouse et al. ........... 428/34.5 |
| 4,927,702 A | * | 5/1990 | Muhlratzer et al. ......... 442/378 |
| 5,435,871 A | * | 7/1995 | Streit ........................ 174/136 |
| 5,486,408 A | * | 1/1996 | Sentendrey ................. 428/110 |
| 5,645,906 A | * | 7/1997 | Park et al. .................. 428/34.9 |
| 5,660,899 A | * | 8/1997 | Rockney et al. ............ 138/149 |
| 5,718,956 A | * | 2/1998 | Gladfelter et al. ......... 428/35.9 |
| 5,744,206 A | * | 4/1998 | Russek et al. ............. 428/36.3 |
| 5,767,024 A | * | 6/1998 | Anderson et al. ........... 442/378 |
| 5,985,385 A | * | 11/1999 | Gottfried .................. 428/36.91 |
| 6,051,291 A | * | 4/2000 | Gladfelter et al. .......... 138/148 |
| 6,309,721 B1 | * | 10/2001 | Gladfelter et al. ......... 428/34.1 |
| 6,340,510 B2 | * | 1/2002 | Hess et al. ................. 428/36.1 |
| 6,413,601 B1 | * | 7/2002 | Blain et al. ................ 428/34.1 |

* cited by examiner

*Primary Examiner*—Dean A. Reichard
*Assistant Examiner*—Adolfo Nino
(74) *Attorney, Agent, or Firm*—Synnestvedt & Lechner LLP

(57) ABSTRACT

A sleeve for providing thermal insulation to elongated substrates is disclosed. The sleeve is formed from a composite sheet having a tough, resilient reinforcing layer to which are attached a metallic reflective layer on one side and a fibrous, non-woven insulative layer on the opposite side. The composite sheet is reverse folded with the reflective layer facing outwardly and the insulative layer facing inwardly. A seam is formed lengthwise along the sleeve in spaced relation to the reverse fold, thereby defining a central space for receiving the elongated substrates. The seam is formed by fusing the inwardly facing insulative layer on each side of the reverse fold together.

27 Claims, 1 Drawing Sheet

THERMALLY INSULATIVE SLEEVE

RELATED APPLICATION

This application is based on and claims the benefit of U.S. Provisional Application No. 60/310,392, filed Aug. 6, 2001.

FIELD OF THE INVENTION

This invention concerns sleeving for encasing and protecting elongated substrates such as wiring harnesses, fuel lines, brake lines and the like subjected to harsh thermal environments.

BACKGROUND OF THE INVENTION

Elongated substrates, such as wiring harnesses, fluid conduits, such as brake lines and fuel lines, and optical fiber bundles, are often used in automotive, aerospace and marine applications where they are subjected to intense heat. Wiring harnesses and fuel lines routed through an enclosed engine compartment, for example, in an automobile, boat or aircraft, are subjected to both radiant and convective heat from the engine, particularly the exhaust manifold. Similarly, fuel lines and wiring in the vicinity of a rocket engine nozzle or on an orbiting satellite, exposed to direct sunlight in the vacuum of space, require thermal protection to ensure proper and continued operation.

Thermal protection has been afforded by the use of composite protective sleeving comprising a layer of woven glass fiber bonded to a layer of reflective metal foil. Flat sheets of the composite are reverse folded with the reflective metal foil layer facing outwardly. Opposite edges of the sheets are positioned adjacent to one another and sewn together forming a longitudinal seam.

While such sleeving provides thermal protection, it is relatively expensive and time consuming to manufacture, largely due to the sewn longitudinal seam. Furthermore, such a seam inevitably leaves layers beneath the reflective layer, such as the glass fiber layer, exposed to the thermal environment. The exposed layers compromise the thermal shielding otherwise afforded by sewn sleeves and allow a relatively hot region to form along the substrate within the sleeve. Additionally, the reverse fold results in a lengthwise crease along the sleeve which significantly weakens the glass fiber layer, decreasing its tear strength by as much as 75% and, thus, providing a failure initiation point on the sleeve. There is clearly a need for a thermal protective sleeve which avoids the disadvantages of the sewn sleeve and which can be produced more rapidly without the need for sewing.

SUMMARY AND OBJECTS OF THE INVENTION

The invention concerns an insulative, flexible sleeve for protecting elongated substrates subjected to harsh thermal environments. The sleeve is formed from a composite sheet comprising a metallic reflective layer, a reinforcing layer and an insulative layer.

The metallic reflective layer is preferably aluminum, either in the form of a thin foil adhered to the reinforcing layer or as a vacuum deposited coating. Preferably the reinforcing layer comprises a flexible, tear-resistant polyester sheet material such as MYLAR® that substantially overlies the reflective layer. The insulative layer comprises a fibrous, non-woven material, preferably a thermoplastic felt having a predetermined thickness providing air spaces for increased insulative capability. The insulative layer substantially overlies and is attached to the reinforcing layer, preferably using adhesive.

Upon forming the layers into a composite sheet, a reverse fold is formed between a first and a second portion of the sheet so as to bring the first sheet portion into overlying relation with the second sheet portion. The fold places the insulative layer on the first sheet portion in facing relation with the insulative layer on the second sheet portion, the reflective layer faces outwardly. A seam is formed between the first and second sheet portions attaching them together. Preferably, the seam is formed by fusing the facing insulative layers on the first and second sheet portions together using ultrasonic welding techniques. The seam is positioned along the sheet in spaced relation to the reverse fold. Together, the first and second sheet portions, the reverse fold and the seam define a central space therebetween adapted to receive elongated substrates to be insulated.

It is an object of the invention to provide a thermally insulative sleeve for elongated substrates.

It is another object of the invention to provide a sleeve insulating against all modes of heat transfer.

It is again another object of the invention to provide a sleeve having a non-woven insulative layer.

It is yet another object of the invention to provide a sleeve formable by welding the insulative layer to itself to form a seam.

It is still another object of the invention to provide a sleeve wherein the welding is performed by ultrasonic welding techniques.

These and other objects and advantages of the invention will become apparent upon consideration of the following drawings and detailed description of preferred embodiments.

DETAILED DESCRIPTION OF THE PREFERRED EMBODIMENTS

Figure 1:
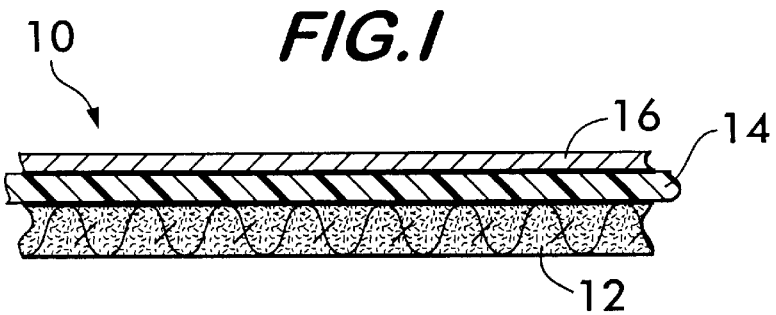
FIG. 1 is a cross-sectional view of a composite sheet prior to folding and welding to form a thermally insulative sleeve according to the invention.

FIG. 1 shows a sectional view of a composite sheet 10 used to form a thermally insulative sleeve according to the invention. Sheet 10 preferably comprises three layers, an insulative layer 12 of a fibrous, non-woven material, a reinforcing layer 14 of a flexible, tear-resistant material and a reflective layer 16. The layers are preferably adhesively bonded together using thermoplastic polyester adhesive or cross-linked polyester adhesive for increased interlaminar shear strength and resistance to adhesive failure at relatively high temperatures. The layers are arranged with the reinforcing layer 14 sandwiched between the reflective layer 16 and the insulative layer 12. This permits the reinforcing layer 14 to reinforce both adjoining layers 12 and 16 without interfering with the thermal protective and insulative functions of either layer as described below.

The reflective layer 16 is preferably comprised of a metal foil, for example, aluminum, or gold for increased reflectivity. Practical aluminum foil thicknesses used with the sleeve range between 0.00035 to about 0.001 inches with a thickness of about 0.00035 inches being preferred for most common automotive applications. Relatively thin foils are preferred to preserve the flexibility of the sleeve and allow it to readily conform to the shape and path of the substrate which it is covering. Reflective layer 16 may also be formed by a metallic coating, such as aluminum, vacuum deposited directly onto the reinforcing layer 14.

The reinforcing layer 14 is preferably a polyester sheet material such as polyethylene terephthalate, known by the brand name MYLAR® which provides excellent tear-resistance (even when folded or creased) and which readily bonds to the other layers comprising the composite sheet 10. MYLAR® also provides an excellent substrate for vapor deposition of metallic coatings. The reinforcing layer 14 is primarily present to prevent the reflective layer 16 from tearing, the relatively thin metallic layer being delicate and easily torn. Other tough materials, such as KAPTON®, may also be used in place of MYLAR®, but MYLAR® is generally preferred, particularly for automotive applications due to its availability and relatively low cost.

The insulative layer 12 is preferably comprised of a fibrous, non-woven thermoplastic felt, such as polyester felt, which obtains its thermal insulating characteristics largely from the presence of the significant quantity of air which is trapped between the fibers forming the felted material. Other feasible felt materials include polypropylene, acrylic, nylon, as well as other thermoplastics. The areal density of the felt for practical applications ranges between about 1.5 ounces per square yard to about 7.25 ounces per square yard. The preferred felt density for-most automotive applications is about 4.5 ounces per square yard. The areal density of the felt determines the amount of air trapped within the felt, with greater density felt trapping more air and, thus, having relatively increased insulative capacity. Denser felts, however, are thicker and less flexible and may not conform to the shape and path of their substrate as well as thinner felts. Thus, the mid range of felt density represents a feasible compromise between the insulative characteristics and the flexibility of the sleeve.

Figure 2:
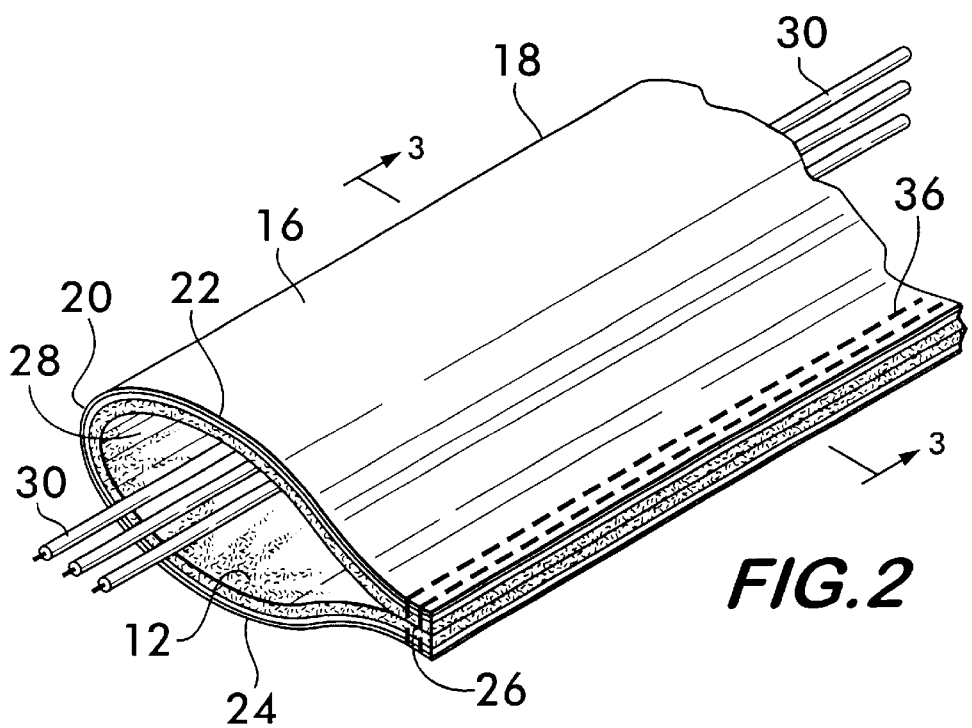
FIG. 2 is a perspective view of a sleeve according to the invention.

FIG. 2 shows a sleeve 18 formed from the sheet 10 of FIG. 1. Sleeve 18 is formed by reverse folding sheet 10 along a reverse fold 20 with the reflective layer 16 facing outwardly, thereby dividing the sheet 10 into first and second sheet portions 22 and 24. The reverse fold 20 brings the sheet portions 22 and 24 into overlying relation with the insulative layer 12 on the first sheet portion 22 facing the insulative layer 12 on the second sheet portion 24. First and second sheet portions 22 and 24 are attached to one another along a seam 26 positioned in spaced relation to the reverse fold 20 and extending lengthwise along the sleeve 18. Together, the first and second sheet portions 22 and 24, the reverse fold 20 and the seam 26 define a central space 28 for receiving an elongated substrate, such as wiring harness 30.

Figure 3:
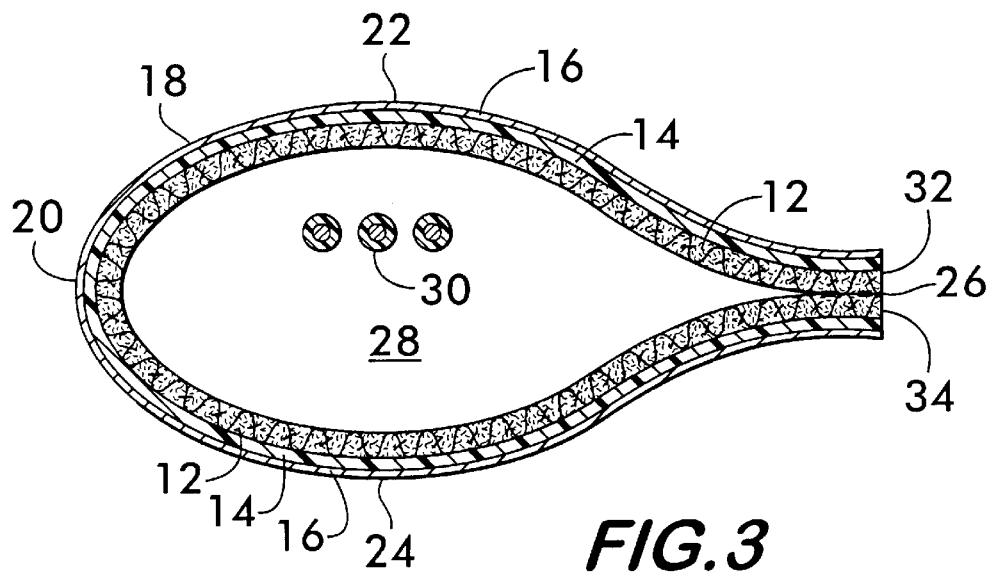
FIG. 3 is a cross-sectional view taken along lines 3—3 of FIG. 2.

As best shown in FIG. 3, seam 26 is preferably formed by positioning opposite edges 32 and 34 of sheet 10 adjacent to each other and joining them together, preferably by ultrasonic welds 36 (see FIG. 2), which fuse the facing insulative layers 12 on each sheet portion 22 and 24 together. The welds 36 are effectively applied through the reflective and reinforcing layers and are actually formed between the felt layer 12 in a region adjacent to each edge 32 and 34. The strength of the ultrasonic weld is proportional to the density of the felt. Denser felt means more material being welded together and, hence, a relatively stronger seam than would be formed by welding lower density felt. Thermoplastic felt is preferred because it welds readily to itself to form a strong bond.

The welds are formed by feeding the edges 32 and 34 of the folded composite sheet 10 between a vibrating horn and a rotating welding head comprising the ultrasonic welder. The welding head rotates in the feed direction of the sheet. A plurality of raised portions are arranged circumferentially around the head which force the sheet edges into contact with the vibrating horn at discrete points along the sheet as the raised portions pass the horn. The vibration of the horn imparts energy to the insulative felt layer 12 which heats it and causes the polyester fibers comprising the layer to fuse together. Depending upon the required strength of the seam, single or multiple rows of welds may be laid down by the welder.

Ultrasonically welding the edges 32 and 34 to form the seam 26 provides several advantages over other methods of joining the edges, such as sewing or using fasteners. Sewing requires that the layers be pierced, thus, weakening them and compromising the integrity of the reflective layer, reducing its reflective characteristics. The welds form a substantially continuous, sealed seam with no openings exposing non-reflective underlayers through which radiation or convective heat may penetrate. The ultrasonic welder has a high rate of material throughput, allowing for high rates of production. There is, furthermore, no need for extra materials or components, such as thread or fasteners, since the weld is formed between elements which are already an integral part of the sheet.

The sleeve 18 thus formed provides thermal protection for a substrate 30 within the central space 28 by effectively blocking all modes of heat transfer. The reflective outer layer 16 blocks radiant thermal energy, which is significant at relatively high temperatures. The insulative felt layer 12, by providing an insulating layer of air trapped within the felt, blocks both convective and conductive heat transfer to the substrate. By positioning the reinforcing MYLAR® layer 14 between the reflective and insulative layers, both layers are reinforced without adversely affecting the thermal performance of either layer, since ambient radiant heat sees only the outer reflective surface and the air gap provided by the felt is adjacent to the substrate 30.

Flammability testing of the sleeve according to the SAE J369 standard indicates that it is self-extinguishing. Emissivity testing of the sleeve according to ASTM E-408, Method B, is expected to show an emissivity of about 0.14. Emissivity may be considered the complement of reflectance for practical purposes, and an emissivity of 0.14 indicates that approximately 86% of incident radiation should be reflected from the sleeve. The sleeve should withstand temperatures between −40° F. and 450° F. and deliver significant thermal protection when subjected to an 800° F. infrared source such that the surface temperature of the sleeve should remain at about 230° F., and the temperature of the space within the sleeve should remain at about 215° F.

The ultrasonically welded, non-woven insulative sleeving according to the invention provides a cost-effective means for thermally protecting elongated substrates in a wide variety of applications while avoiding the disadvantages of higher cost, lower production rates, decreased tear strength and incomplete thermal protection associated with previous insulative sleeving.

What is claimed is:

1. A composite sheet for providing thermal insulation, said sheet comprising:
   a metallic reflective layer;
   a reinforcing layer comprising a flexible, tear-resistant material substantially overlying said reflective layer and attached thereto;

an insulative layer comprising a fibrous, non-woven material, said insulative layer having a predetermined thickness providing air spaces for increased insulative capability, said insulative layer substantially overlying said reinforcing layer and being attached thereto, wherein said sheet is subdivided into first and second sheet portions, a reverse fold being formed between said first and said second sheet portions so as to bring said first sheet portion into overlying relation with said second sheet portion, said insulative layer on said first sheet portion facing said insulative layer on said second sheet portion;

a seam positioned lengthwise along edges of said first and second sheet portions, said edges being substantially aligned with one another in overlying relationship, said insulative layer on said first and second sheet portions being fused together along said edges thereby attaching said first and second sheet portions to one another; and said first and second sheet portions and said reverse fold and said seam defining a central space therebetween adapted to receive elongated substrates to be insulated.

2. A composite sheet according to claim 1, wherein said reflective layer and said insulative layer are adhesively attached to said reinforcing layer.

3. A composite sheet according to claim 1, wherein said reflective layer comprises aluminum foil having a thickness between about 0.00035 inches to about 0.001 inches.

4. A composite sheet according to claim 3, wherein said reinforcing layer comprises polyethylene terephthalate.

5. A composite sheet according to claim 4, wherein said insulative layer comprises a felt material.

6. A composite sheet according to claim 5, wherein said felt material is a thermoplastic.

7. A composite sheet according to claim 6, wherein said felt material is chosen from among the group consisting of polyester felt, polypropylene felt, acrylic felt and nylon felt.

8. A composite sheet according to claim 5, wherein said felt material has an areal density of between about 1.5 ounces per square yard to about 7.25 ounces per square yard.

9. A composite sheet according to claim 5, wherein said felt material has an areal density of about 4.5 ounces per square yard.

10. A composite sheet according to claim 1, wherein said seam is formed by ultrasonically welding said insulative layer of said first portion to said insulative layer of said second portion.

11. A sleeve for providing thermal insulation to elongated substrates, said sleeve comprising:

a multi-layer sheet having a first and a second sheet portion;

a reverse fold formed between and defining said first and second sheet portions so as to bring said first sheet portion into overlying relation with said second sheet portion;

a seam formed between said first and second sheet portions and attaching them together, said seam being positioned along said sheet portions in spaced relation to said reverse fold, said first and second sheet portions and said reverse fold and said seam defining a central space adapted to receive said elongated substrates; and wherein said multi-layer sheet comprises:

a metallic reflective layer forming an outwardly facing surface of said first and second sheet portions;

a reinforcing layer comprising a flexible, tear-resistant material positioned between said central space and said reflective layer and attached thereto; and an insulative layer comprising a fibrous, non-woven material having a predetermined thickness providing air spaces for increased insulative capability, said insulative layer being positioned between said central space and said reinforcing layer and being attached thereto.

12. A sleeve according to claim 11, wherein said reflective layer and said insulative layer are adhesively attached to said reinforcing layer.

13. A sleeve according to claim 11, wherein said insulative layer comprises a felt material.

14. A sleeve according to claim 13, wherein said felt material comprises a thermoplastic.

15. A sleeve according to claim 14, wherein said felt material is chosen from among the group consisting of polyester felt, polypropylene felt, acrylic felt and nylon felt.

16. A sleeve according to claim 13, wherein said felt has an areal density of between about 1.5 ounces per square yard to about 7.25 ounces per square yard.

17. A sleeve according to claim 16, wherein said felt has an areal density of about 4.5 ounces per square yard.

18. A sleeve according to claim 14, wherein said seam is positioned along edges of said first and second sheet portions, said edges being substantially aligned with one another in overlying relationship.

19. A sleeve according to claim 18, wherein said insulative layer on said first and second sheet portions is fused together along said edges, thereby forming said seam.

20. A sleeve according to claim 19, wherein said seam is formed by ultrasonically welding said insulative layer on said first sheet portion to said insulative layer on said second sheet portion.

21. A sleeve according to claim 11, wherein an elongated substrate is positioned within said central space.

22. A sleeve according to claim 21, wherein said elongated substrate comprises a wiring harness.

23. A sleeve for providing thermal insulation to elongated substrates, said sleeve comprising:

a reinforcing layer comprising a flexible, tear-resistant material having oppositely facing surfaces;

a reflective metallic coating positioned on one of said surfaces;

an insulative layer comprising a fibrous, non-woven material having a predetermined thickness providing air spaces for increased insulative capability being attached to the other of said surfaces;

a reverse fold formed in said reinforcing layer dividing said reinforcing layer into first and second portions, said reverse fold bringing said insulative layer on said first portion into facing relation with said insulative layer on said second portion;

a seam formed between said insulative layers on said first and second portions and attaching them together, said seam being positioned in spaced relation to said reverse fold, said seam, said reverse fold and said first and second portions defining a central space therebetween for receiving said elongated substrates.

24. A sleeve according to claim 23, wherein said reinforcing layer comprises polyethylene terephthalate.

25. A sleeve according to claim 24, wherein said reflective metallic coating comprises vacuum deposited aluminum.

26. A sleeve according to claim 25, wherein said insulative layer comprises a felt material.

27. A sleeve according to claim 26, wherein said felt material is polyester felt.

* * * * *

UNITED STATES PATENT AND TRADEMARK OFFICE
CERTIFICATE OF CORRECTION

PATENT NO.   : 6,610,928 B2
DATED        : August 26, 2003
INVENTOR(S)  : Brian M. Snyder and Patrick M. Pendergast It is certified that error appears in the above-identified patent and that said Letters Patent is hereby corrected as shown below:

<u>Title page,</u>
Item [75], Inventors, change "Brian M. Synder, Downingtown, PA (US)"
to -- Brian M. Snyder, Downingtown, PA (US) and Patrick M. Pendergast, Malvern, PA (US) --.

Signed and Sealed this

Second Day of December, 2003

JAMES E. ROGAN
*Director of the United States Patent and Trademark Office*